(12) United States Patent
Calavrezo et al.

(10) Patent No.: US 9,282,041 B2
(45) Date of Patent: Mar. 8, 2016

(54) CONGESTION PROFILING OF COMPUTER NETWORK DEVICES

(71) Applicant: Lenovo Enterprise Solutions (Singapore) Pte. Ltd., Singapore (SG)

(72) Inventors: Dan-Alexandru Calavrezo, Bucharest (RO); Casimer M. DeCusatis, Poughkeepsie, NY (US); Keshav G. Kamble, Fremont, CA (US); Sorin A. Pistirica, Bucharest (RO)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 13/943,136

(22) Filed: Jul. 16, 2013

(65) Prior Publication Data

US 2015/0023172 A1    Jan. 22, 2015

(51) Int. Cl.
*H04L 12/26* (2006.01)
*H04L 12/801* (2013.01)

(52) U.S. Cl.
CPC .................................... *H04L 47/11* (2013.01)

(58) Field of Classification Search
None
See application file for complete search history.

(56) References Cited

U.S. PATENT DOCUMENTS

| 6,405,256 | B1 | 6/2002 | Lin et al. | |
|---|---|---|---|---|
| 6,603,719 | B1 | 8/2003 | Wu | |
| 6,665,751 | B1 | 12/2003 | Chen et al. | |
| 6,918,005 | B1 | 7/2005 | Marchant et al. | |
| 7,743,183 | B2 | 6/2010 | Virdi et al. | |
| 8,346,999 | B2 | 1/2013 | Dubal et al. | |
| 2001/0048664 | A1 | 12/2001 | Sano | |
| 2006/0168292 | A1* | 7/2006 | Yukimatsu | 709/231 |
| 2006/0203730 | A1* | 9/2006 | Zur | 370/235 |
| 2009/0113069 | A1* | 4/2009 | Prabhakar et al. | 709/235 |
| 2009/0238070 | A1* | 9/2009 | Rivers et al. | 370/235 |
| 2011/0296064 | A1 | 12/2011 | Ehsan et al. | |
| 2013/0215750 | A1* | 8/2013 | Beecroft et al. | 370/235 |
| 2014/0269271 | A1* | 9/2014 | Gafni et al. | 370/230 |

* cited by examiner

*Primary Examiner* — Chi H Pham
*Assistant Examiner* — Fahmida Chowdhury
(74) *Attorney, Agent, or Firm* — Zilka-Kotab, PC (57) ABSTRACT

A method may include transmitting data frames from a reaction point of a source device. The method may also include receiving, at the reaction point, congestion notification messages corresponding to the transmitted data frames and containing congestion feedback data regarding a particular network switching device and an identifier of the particular network switching device. The method may also include modifying a congestion profile for the particular network switching device by correlating the identifier of the particular network switching device to a profile entry, and updating the profile entry with the congestion feedback data.

28 Claims, 5 Drawing Sheets

CONGESTION PROFILING OF COMPUTER NETWORK DEVICES

TECHNICAL FIELD

The field of the disclosure relates to computer networks, and more specifically, to computer networks enabled to support the quantized congestion notification (QCN) protocol.

BACKGROUND

Computer systems typically include a combination of computer programs and hardware, such as semiconductors, transistors, chips, circuit boards, storage devices, and processors. The computer programs are stored in the storage devices and are executed by the processors. Computer systems often send and receive data. A computer network is a telecommunications network that allows computer systems to exchange that data.

SUMMARY

According to embodiments of the disclosure a method and computer system for mitigating congestion in a computer network from a source device are provided. The method may include transmitting data frames from a reaction point of a source device. The method may also include receiving, at the reaction point, congestion notification messages corresponding to the transmitted data frames and containing congestion feedback data regarding a particular network switching device and an identifier of the particular network switching device. The method may also include modifying a congestion profile for the particular network switching device by correlating the identifier of the particular network switching device to a profile entry, and updating the profile entry with the congestion feedback data.

According to embodiments of the disclosure a method and computer system for mitigating congestion in a computer network at a switching device are provided. The method may include receiving, at a congestion point, data frames from a reaction point of a source device, wherein the data frames contain data regarding the source device and an identifier of the source device. The method may also include modifying a congestion profile for the source device by correlating the identifier of the source device to a profile entry, and updating the profile entry with the data.

DETAILED DESCRIPTION

Many computer networks, such as data center networks, consist of multiple computer systems, such as servers, connected by an array of packet switching devices. Data may be exchanged between the systems through the network. Network congestion may occur at a switching device when it is carrying a quantity of data that deteriorates its quality of service. Network congestion may result in transmission delay or data loss. Protocols have been developed to respond to data congestion in order to regulate the transmission of data from a reaction point within a source. For example, quantized congestion notification (QCN) is a protocol which reduces network congestion by way of congestion notification packets sent to congestion points. When congestion is experienced within the QCN enabled queue of the congestion point, a congestion notification message (CNM) is sent back to the reaction point, and the transmission of data is adjusted in order to alleviate the congestion. Aspects of the present disclosure are based upon the recognition that efficiencies may be gained by proactively adjusting the transmission of data prior to receiving CNMs, thereby limiting the flow of data to the congestion point before it experiences congestion.

Embodiments of the present disclosure are directed towards a system for mitigating congestion in a computer network. This system may include generating congestion profiles for network switching devices that are configured to switch data between source and destination devices. The profiles may be generated or updated as congestion notification messages are received from congestion points within the network. These profiles may then be used to proactively control the rate and course of data transmission and thereby, mitigate network congestion.

Figure 1:
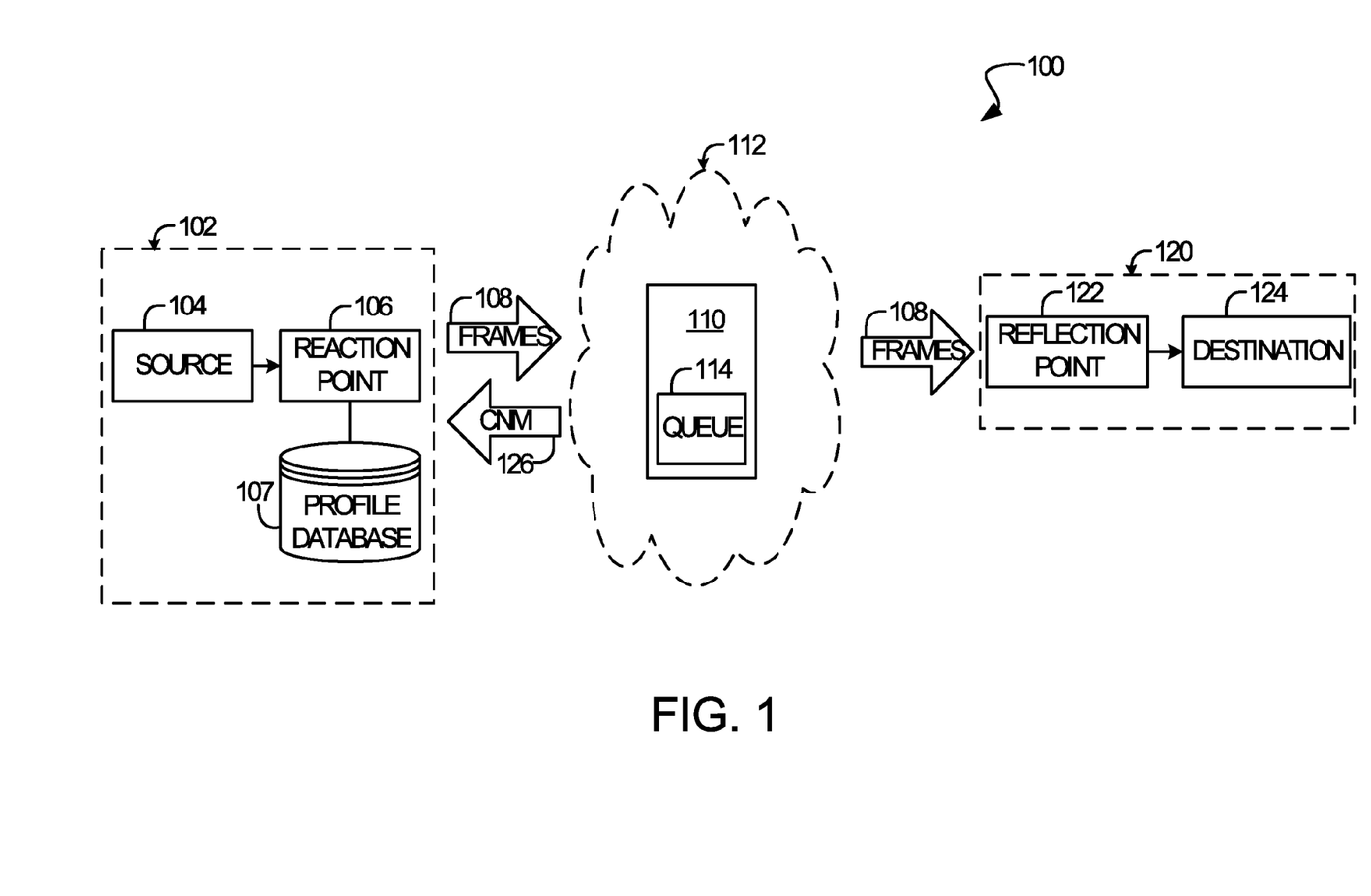
FIG. 1 depicts a high-level block diagram representation of a data transmission pathway through a computer network, according to embodiments of the present disclosure.

Referring to the drawings, wherein like numbers denote like parts throughout the several views, FIG. 1 depicts a high-level block diagram representation of a data transmission pathway 100, according to embodiments of the present disclosure. The pathway 100 may represent one possible course through a computer network consisting of any number of end points, such as servers, and switching devices, such as switches, connected in a variety of configurations. The pathway 100 may include a source 104, a reaction point 106, and a profile database 107. In various embodiments, the source 104, reaction point 106, and profile database 107 may be located within a single computer system 102, such as a network server or client. In various embodiments, the computer system 102 may be considered a source device. The pathway may also consist of a network switching devices 110 located within the computer network 112 and communicatively connected to the computer system 102. The device 110 may be a switch, a bridge, or any other network switching device. The network 112 may consist of any number of switching devices such as the device 110 communicatively connected to any number of computer systems such as computer system 102. In various embodiments the network 112 may be a local area network (LAN), which can use various communication protocols, such as Ethernet-base protocols. In certain embodiments, the network 112 can be a wide area network (WAN), such as the Internet. Embodiments include multiple LANs and/or WANs as part of network 112.

The pathway 100 may also include a reflection point 122 and a destination 124. In various embodiments, the reflection point 122 and the destination 124 may also be located within a single computer system 120, such as a server or client. In various embodiments, the computer system 120 may be considered a destination device. The system 120 may also be communicatively connected to the switching device 110. This connection allows the system 102 and the system 120 to communicate with each other. An example of this communication may include data frames 108 transmitted from the source 104 through the reaction point 106. The frames 108 pass through the device 110 located within the network 112. The frames 108 may be received by the reflection point 122. The data frames 108 may include a congestion notification tag to indicate that the reaction point 106 is a quantized congestion notification enabled so as to have the ability to react to congestion notification messages by algorithmically altering the flow rate of data frames 108. In another embodiment, the congestion notification tag is not included in the congestion controlled flow frames but the congestion point switches can still react to congestion due to such frames.

Since the switching device 110 may be connected to any number of systems, at various times it may experience congestion due to a large amounts of data frames 108 passing through the device 110. Due to this congestion, the device 110 may also be referred to as a congestion point. The device 110 may include one or more queues 114 which serve as buffer where frames 108 may be stored while waiting to pass through the device 110. When this congestion occurs, the device 110 may generate and send a congestion notification message (CNM) 126 back to the reaction point 106. The CNM 126 may include data regarding the congestion. An example of congestion data is the quantized congestion notification (QCN) protocol of the Institute of Electrical and Electronics Engineers (IEEE) standard 802.1Qau. Various data values contained within a CNM 126 are discussed in further detail in FIG. 2. In various embodiments, the operations and devices discussed herein are restricted to operating within the data link layer, or layer 2, of the Open Systems Interconnection (OSI) model of computer networking. In various embodiments, congestion managed flows of data frames may be restricted to unicast flows where data frames are transmitted with a single specific destination.

In operation, the pathway 100 may serve to generate congestion profiles for network switching devices 100. As previously mentioned, these switching devices 100 may be configured to switch data between a source 104 and a destination 124. This operation may begin with the source 104 transmitting data frames 108 from a reaction point 106. The switching device 100 may then receive the data frames 108 while experience some level of network congestion. As previously mentioned, the device 110 may be considered a congestion point and generate a congestion notification message 126 corresponding to the transmitted data frames 108, and containing congestion feedback data regarding the congestion experienced at the congestion point 110 and an identifier of the congestion point 110. The switching device may receive the CNM 126 and modify a congestion profile for the congestion point 110 by correlating the identifier to a profile entry, and updating the profile entry with the congestion feedback data.

Figure 2:
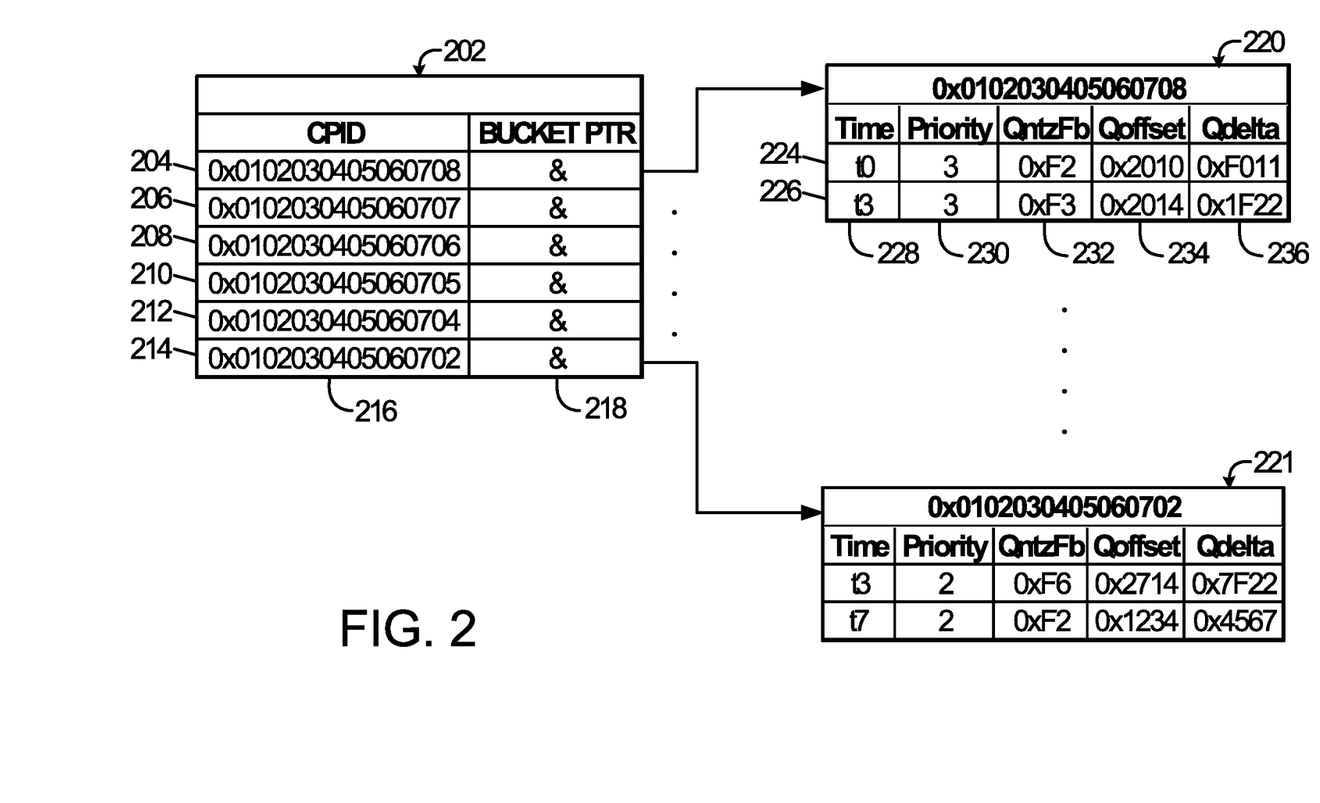
FIG. 2 depicts block diagram of an example data structure for congestion point profile data, according to embodiments of the present disclosure.

FIG. 2 depicts block diagram of an example data structure for congestion point profile data 202, according to embodiments of the disclosure. The profile data 202 may be stored within the profile database 107 of the computer system 102. Every computer system connected to the network 112 which transmits data frames 108 may contain a profile database 107 which stores profile data 202. The profile data 202 may include records 204, 206, 208, 210, 212, and 214. Each record may represent a congestion point 110 which has returned a CNM 126 to the reaction point 106. Each congestion point 110 may be identified by a congestion point identifier 216. A congestion point identifier 216 may be considered an identifier of a particular network switching device and may be an identifier having a 64 bit value. The profile data 202 may also include a bucket pointer 218 for each record. The bucket pointer 218 may be a pointer to a congestion point data sub-table 220. Each sub-table 220 may include data contained with each CNM 126 from the respective congestion point 110.

The sub-table 220 may include any number of entries such as 224 and 226. These entries represent a CNM 126 received from the respective congestion point 110. Each entry may include a time 228, an encapsulated priority value 230, a quantized feedback value 232, a Qoffset value 234, and a Qdelta value 236. The time 228 may be the time at which the entry was added in the profile table 220. The encapsulated priority value 230 may be a value which represents a data frame's congestion notification priority value which corresponds to IEEE 802.1P bits in the original data frame sent by the reaction point. The quantized feedback value 232, the Qoffset value 234, and the Qdelta 236 may be values which represent the parameters of the congestion experienced at the congestion point 110. As previously stated, these values may be calculated using the QCN protocol of the IEEE standard 802.1Qau.

In various embodiments, the congestion point 110 may be configured to store profile data about sources and reaction points. Similar to profile data 202, the reaction point profile may include data pertaining to various reaction points such as the computer system 102. The reaction point profile data may use a reaction point identifier in place of the congestion point identifier. A reaction point identifier may be an identifier having a 16 bit value. The reaction point profile would not contain the congestion information of the profile for a congestion point, rather it would include data specific to the reaction point, such as data regarding the data link layer, or layer 2, of the Open Systems Interconnection (OSI) model of computer networking. A result of the collection and analysis of reaction point data is to configure the congestion point 110 to types of data flow as they are received, which is further discussed in FIG. 4.

Figure 3:
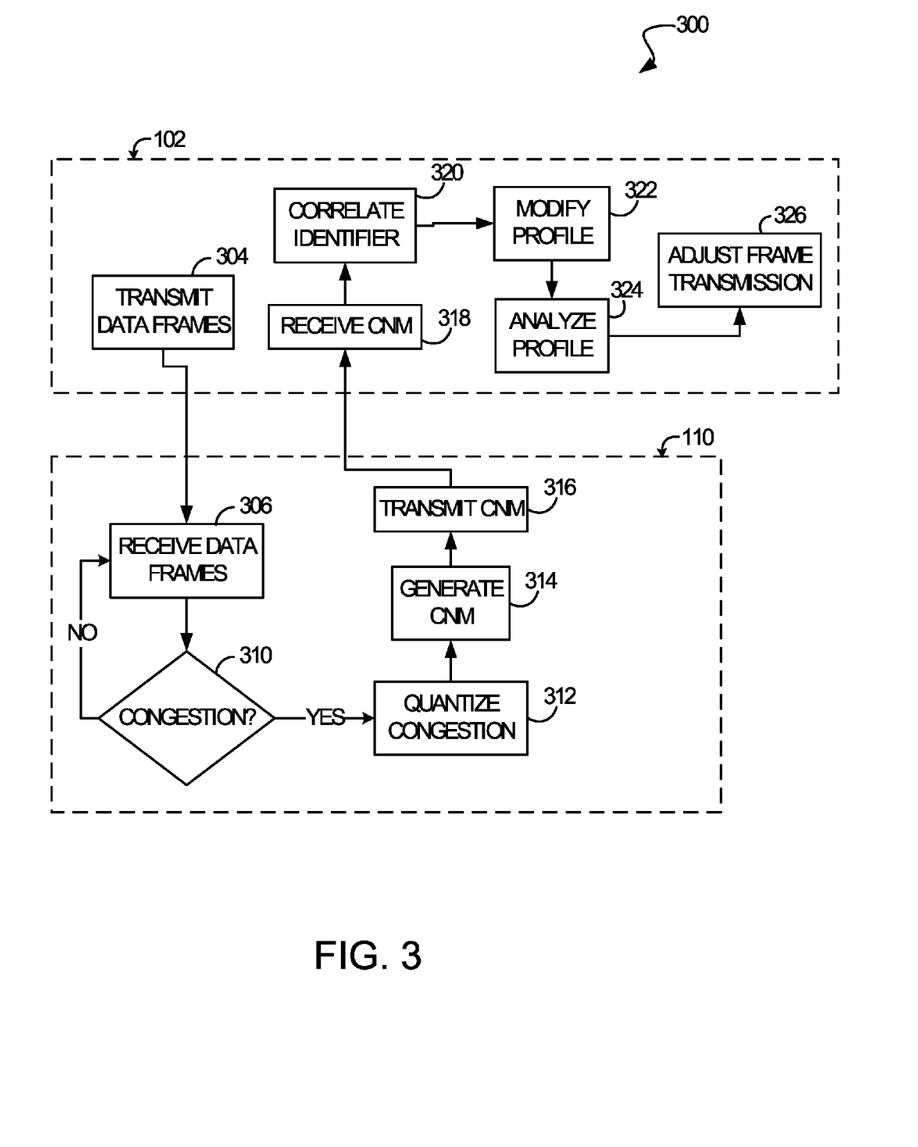
FIG. 3 depicts a flow chart of example process for modifying congestion point profiles, according to embodiments of the present disclosure.

FIG. 3 depicts a flow chart of process 300 for modifying congestion profiles according to embodiments of the present disclosure. The process 300 may begin within the computer system 102. At block 304, the reaction point 106 may transmit data frames 108. At block 306, the data frames 108 may be received by the congestion point 110. At block 310, a deciding operation may determine if the congestion point 110 is experiencing congestion. This congestion may be experienced when the congestion point 110 is receiving more data frames 108 than it can transmit. The parameters of the congestion may be determined by referring to the amount of data frames 108 within the queue 114. If the congestion point 110 is not experiencing congestion, then the process 300 may return to block 306 and the congestion point 110 may continue to receive data frames 108. If the congestion point 110 is experiencing congestion then the process 300 may proceed to block 312.

At block 312, the congestion may be quantized. As previously stated, the quantization of the congestion may be done using QCN protocol of the IEEE standard 802.1Qau. At block 314, the congestion point 110 may generate a congestion notification message 126. The CNM 126 may include the congestion data from block 312 and a congestion point identifier (CPID) 216. At block 316, the CNM 126 may be transmitted by the congestion point 110. At block 318, the CNM 126 may be received by the reaction point 106 of the system 102. At block 320, the congestion point may use the CPID 216 to correlate the CNM 126 to an entry within the profile data 202. At block 322, the profile of the congestion point 110 may be modified by updating the congestion point data sub-table 220 corresponding to the congestion point 110 by creating a new entry in the sub-table 220 with the data contained in the CNM 126. If the profile data 202 does not contain a correlating entry to the CPID 216, then a new entry may be made with a corresponding sub-table 220 to log the received CNM 126.

At block 324, an analysis of the profile data 202 may be done by the computer system 102 in order to assess the various switching devices of the network 112. For example, from an analysis of the profile data 202, the computer system 102 may discover that a particular switch regularly experiences congestion at a particular time of day. At block 326, the computer system 102 may adjust the rate at which it transmits data frames and/or the route in which it transmits data frames based on an analysis of the profile data 202. The result of these adjustments and data frame transmission may have the overall result of mitigating (or completely avoiding) congestion within the network 112. For instance, the system 102 may use the analysis from block 324 to adjust how it uses that particular switch. The system 102 may determine not to use that switch at all during that particular time of day, it may send low priority data during that time, or it may merely decrease the amount of data it sends though that route at that particular time. When the computer system 102 performs the process 300 with regards to multiple congestion points within the network, the system 102 may use a system wide analysis to improve overall network performance by adjusting the rate and routing of its own data transmissions.

Figure 4:
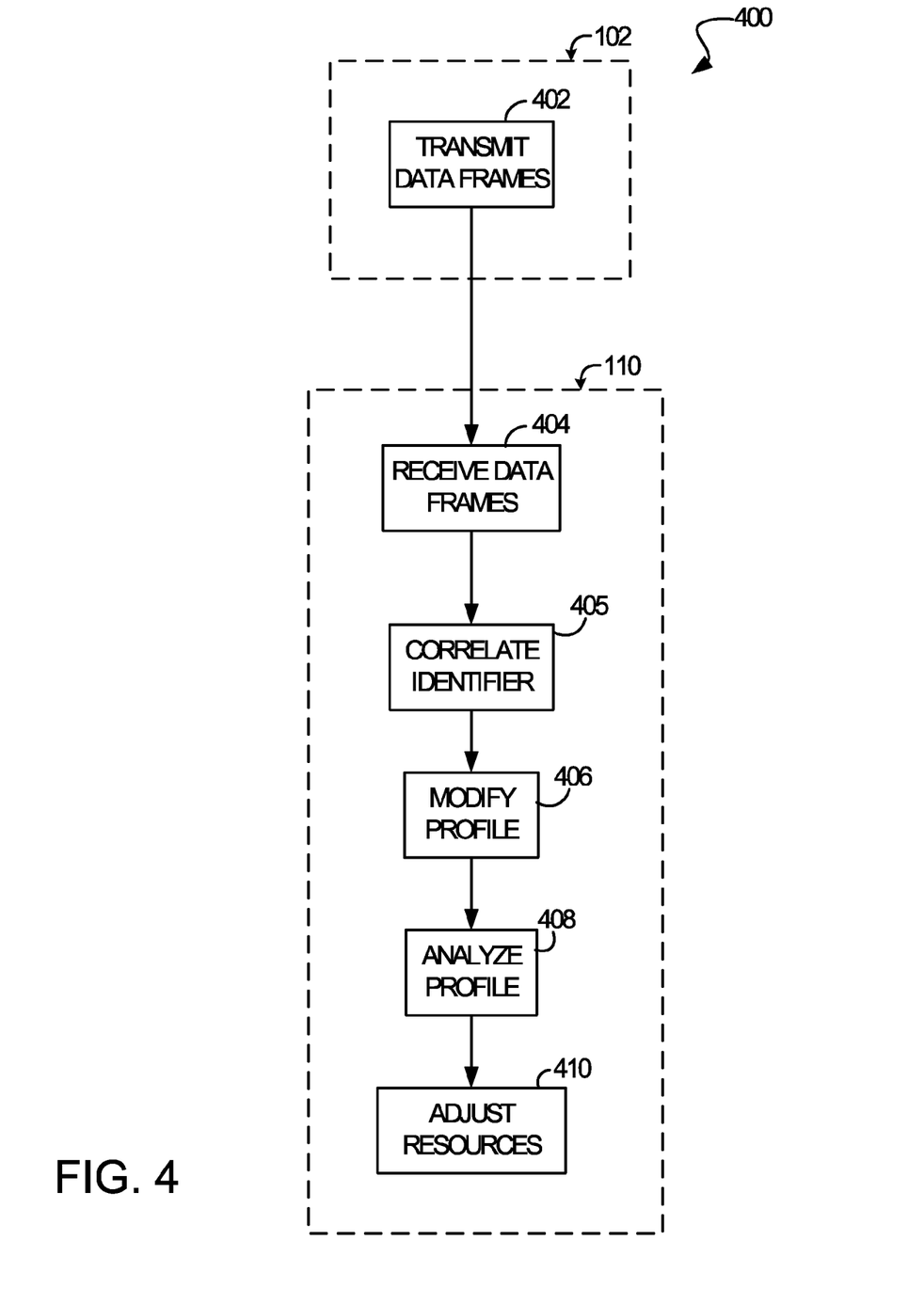
FIG. 4 depicts a flow chart of example process for modifying reaction point profiles, according to embodiments of the present disclosure.

FIG. 4 depicts a flow chart of example process 400 for modifying reaction point profiles, according to embodiments of the present disclosure. The process 400 may begin within the computer system 102. At block 402, the reaction point 106 may transmit data frames 108. At block 404, the data frames 108 may be received by the congestion point 110. At block 405, the congestion point may use the reaction point identifier contained in the data frames 108 to correlate the data frames to an entry within reaction point profile data stored in the congestion point 110. At block 406, the profile of the reaction point 106 may be modified by updating the reaction point data corresponding to the reaction point 106 by creating a new entry with the data contained in the data frames 108. If the reaction point profile data does not contain a correlating entry to the reaction point 106, then a new entry may be made with a corresponding sub-table to log the received information.

At block 408, an analysis of the reaction point profile data may be done by the congestion point 110. At block 410, the congestion point 110 may use the analysis of the reaction point profiles to determine how the resources of the congestion point 110 are allocated. By using the reaction point profile analysis to determine congestion point 110 resource allocation, a congestion point 110 may be able to direct data transmission flow in relation to both the origination and the destination of the data frames.

Figure 5:
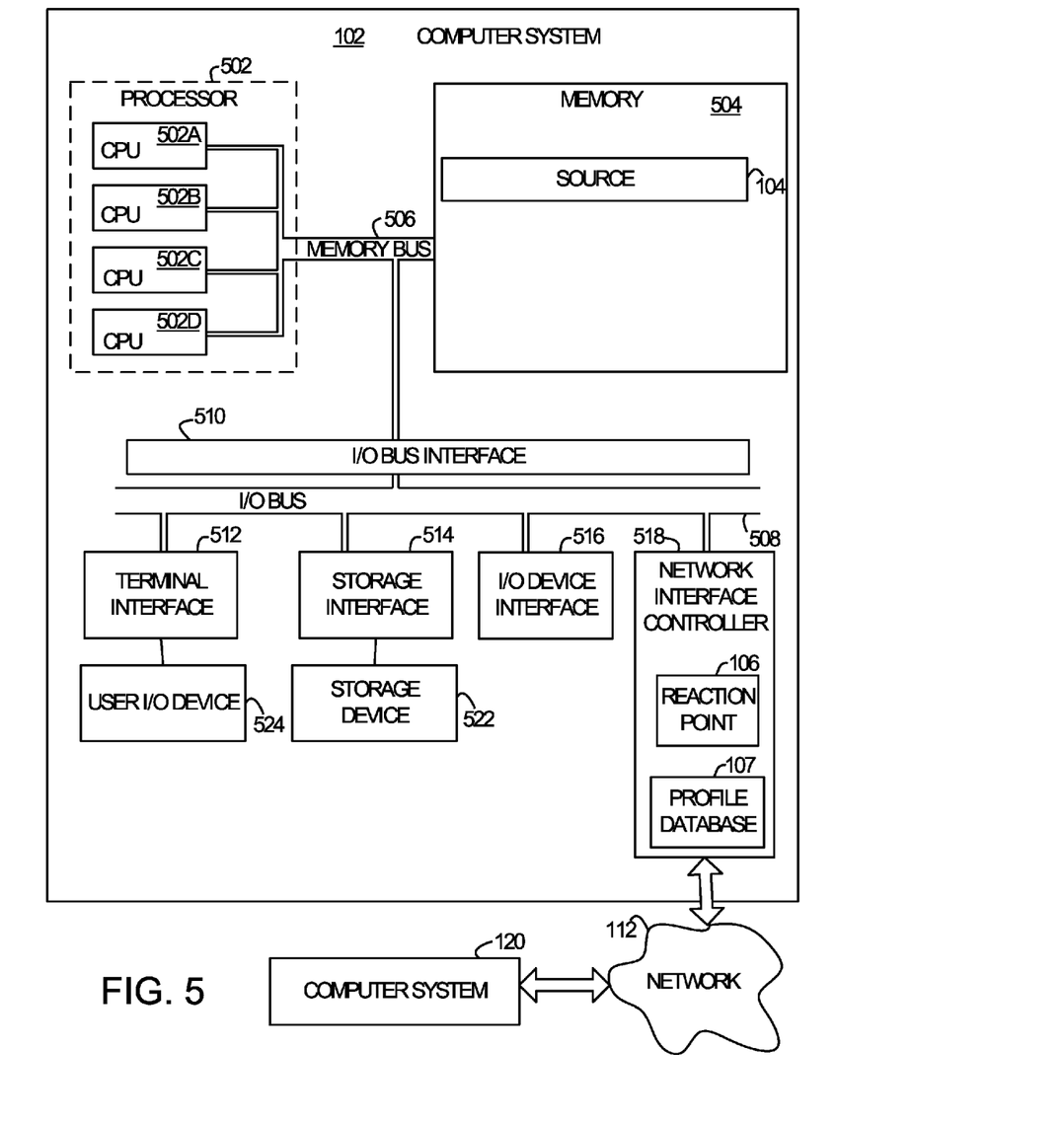
FIG. 5 depicts a high-level block diagram of an exemplary computer system for implementing embodiments of the present disclosure.

FIG. 5 depicts a high-level block diagram of a computer system 102 for implementing embodiments of the present disclosure. As previously stated, the computer system 102 may be connected to another computer system 120 via a network 112, according to an embodiment of the present disclosure. The terms "server" and "client" are used herein for convenience only, and in various embodiments a computer system that operates as a client computer in one environment may operate as a server computer in another environment, and vice versa. The mechanisms and apparatus of embodiments of the present disclosure apply equally to any appropriate computing system, including a network switching devices such as switches or hubs. The major components of the computer system 102 comprise one or more processors 502, a main memory 504, a terminal interface 512, a storage interface 514, an I/O (Input/Output) device interface 516, and a network interface controller 518, all of which are communicatively coupled, directly or indirectly, for inter-component communication via a memory bus 506, an I/O bus 508, and an I/O bus interface unit 510.

The computer system 102 contains one or more general-purpose programmable central processing units (CPUs) 502A, 502B, 502C, and 502D, herein generically referred to as the processor 502. In an embodiment, the computer system 102 contains multiple processors typical of a relatively large system; however, in another embodiment the computer system 102 may alternatively be a single CPU system. Each processor 502 executes instructions stored in the main memory 504 and may comprise one or more levels of on-board cache.

In an embodiment, the main memory 504 may comprise a random-access semiconductor memory, storage device, or storage medium (either volatile or non-volatile) for storing or encoding data and programs. In another embodiment, the main memory 504 represents the entire virtual memory of the computer system 102, and may also include the virtual memory of other computer systems coupled to the computer system 102 or connected via a network. The main memory 504 is conceptually a single monolithic entity, but in other embodiments the main memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 504 may store all or a portion of the following: a source 104, hereafter collectively referred to as "stored programs and data." Also, the main memory 504 located within the computer system 120 may store all or a portion of a destination 124. Although the stored programs and data are illustrated as being contained within the memory 504 in the computer system 102, in other embodiments some or all of them may be on different computer systems and may be accessed remotely, e.g., via a network. The computer system 102 may use virtual addressing mechanisms that allow the programs of the computer system 102 to behave as if they only have access to a large, single storage entity instead of access to multiple, smaller storage entities. Thus, while stored programs and data are illustrated as being contained within the main memory 504, these components are not necessarily all completely contained in the same storage device at the same time. Further, although the stored programs and data are illustrated as being separate entities, in other embodiments some of them, portions of some of them, or all of them may be packaged together.

In an embodiment, the stored programs and data comprise instructions or statements that execute on the processor 502 or instructions or statements that are interpreted by instructions or statements that execute on the processor 302, to carry out the functions as further described with reference to FIGS. 1, 2, 3, and 4. In another embodiment, the stored programs and data are implemented in hardware via semiconductor devices, chips, logical gates, circuits, circuit cards, and/or other physical hardware devices in lieu of, or in addition to, a processor-based system. In an embodiment, the stored programs and data comprise data in addition to instructions or statements.

The memory bus 506 provides a data communication path for transferring data among the processor 502, the main memory 504, and the I/O bus interface 510. The I/O bus interface 510 is further coupled to the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508.

The I/O interface units support communication with a variety of storage and I/O devices. For example, the terminal interface unit 512 supports the attachment of one or more user I/O devices 520, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 102, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer). In another embodiment, the storage device 522 may be implemented via any type of secondary storage device. The contents of the main memory 504, or any portion thereof, may be stored to and retrieved from the storage device 522, as needed. The I/O device interface 516 provides an interface to any of various other input/output devices or devices of other types, such as printers or fax machines. The network interface controller 518 provides one or more communications paths from the computer system 102 to other digital devices and computer systems; such paths may comprise, e.g., one or more networks. The network interface controller 518 may also store a reaction point 106 and a profile database 107. Also, the network interface controller 518 located within the computer system 120 may store a reflection point 122.

Although the memory bus 506 is shown in FIG. 5 as a relatively simple, single bus structure providing a direct communication path among the processors 502, the main memory 504, and the I/O bus interface 510, in fact the memory bus 506 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 102 may, in fact, contain multiple I/O bus interface units 510 and/or multiple I/O buses 508. While multiple I/O interface units are shown, which separate the I/O bus 508 from various communications paths running to the various I/O devices, in other embodiments some or all of the I/O devices are connected directly to one or more system I/O buses.

In various embodiments, the computer system 102 is a multi-user mainframe computer system, a single-user system, or a server computer or similar device that has little or no direct user interface, but receives requests from other computer systems (clients). In other embodiments, the computer system 102 is implemented as a desktop computer, portable computer, laptop or notebook computer, tablet computer, pocket computer, telephone, smart phone, or any other appropriate type of electronic device.

FIG. 5 is intended to depict the representative major components of the computer system 102. But, individual components may have greater complexity than represented in FIG. 5, components other than or in addition to those shown in FIG. 5 may be present, and the number, type, and configuration of such components may vary. Several particular examples of such additional complexity or additional variations are disclosed herein; these are by way of example only and are not necessarily the only such variations. The various program components illustrated in FIG. 5 and implementing various embodiments of the disclosure may be implemented in a number of manners, including using various computer applications, routines, components, programs, objects, modules, data structures, etc., and are referred to herein as "software," "computer programs," or simply "programs."

The computer programs comprise one or more instructions or statements that are resident at various times in various memory and storage devices in the computer system 102 and that, when read and executed by one or more processors in the computer system 102 or when interpreted by instructions that are executed by one or more processors, cause the computer system 102 to perform the actions necessary to execute steps or operations comprising the various aspects of embodiments of the disclosure. Aspects of embodiments of the disclosure may be embodied as a system, method, or computer program product. Accordingly, aspects of embodiments of the disclosure may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present disclosure may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the disclosure are described with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the disclosure may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present disclosure. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the disclosure may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the disclosure. But, any particular program nomenclature used herein is used merely for convenience, and thus embodiments of the disclosure are not limited to use solely in any specific application identified and/or implied by such nomenclature. The environments illustrated in FIG. 5 are not intended to limit the present disclosure. Indeed, other alternative hardware and/or program environments may be used without departing from the scope of embodiments of the disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the disclosure, reference was made to the accompanying drawings (where like numbers represent like elements), which form a part hereof, and in which is shown by way of illustration specific exemplary embodiments in which the disclosure may be practiced. These embodiments were described in sufficient detail to enable those skilled in the art to practice the disclosure, but other embodiments may be utilized and logical, mechanical, electrical, and other changes may be made without departing from the scope of the present disclosure. In the previous description, numerous specific details were set forth to provide a thorough understanding of embodiments of the disclosure. But, embodiments of the disclosure may be practiced without these specific details. In other instances, well-known circuits, structures, and techniques have not been shown in detail in order not to obscure embodiments of the disclosure.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A computer implemented method for generating congestion profiles for network switching devices, comprising:
    transmitting data frames from a reaction point of a source device;
    receiving, at the reaction point, congestion notification messages corresponding to the transmitted data frames, each congestion notification message including congestion feedback data regarding a particular network switching device and an identifier of the particular network switching device; and
    modifying a congestion profile for the particular network switching device by:
        correlating the identifier of the particular network switching device to a profile entry in a congestion point data sub-table,
        updating the profile entry with the congestion feedback data and a timestamp in response to a determination that the profile entry in the congestion point data sub-table exists, and
        creating a new profile entry in the congestion point data sub-table, the new profile entry including the congestion feedback data and a timestamp, in response to a determination that the profile entry does not already exist in the congestion point data sub-table.

2. The method of claim 1, further comprising adjusting a data transmission rate for transmitting data frames based on an analysis of the congestion profile.

3. The method of claim 1, further comprising adjusting a data transmission route for transmitting data frames through a network based on an analysis of one or more congestion profiles stored in corresponding congestion point data sub-tables.

4. The method of claim 1, further comprising creating a congestion point data table having one or more records therein, each record including a congestion point identifier and a bucket pointer that points to a congestion point data sub-table that is configured to store congestion point data for the device identified by the congestion point identifier.

5. The method of claim 4, wherein each congestion point data sub-table comprises one or more profile entries for the device identified by the congestion point identifier, each profile entry including:
    a timestamp indicating when the profile entry was added to the congestion point data sub-table;
    an encapsulated priority value that indicates a data frame's congestion notification priority;
    a quantized feedback value;
    a Qoffset value; and
    a Qdelta value.

6. The method of claim 1, wherein the particular network switching device is a network switch with a quantized congestion notification enabled queue, and wherein the identifier is a congestion point identifier having a 64 bit value.

7. The method of claim 1, further comprising allocating resources of the particular network switching device based on an analysis of the congestion profile.

8. The method of claim 1, wherein the congestion feedback data includes an encapsulated priority value, a quantized feedback value, a Qoffset value, or a Qdelta value.

9. A computer system including a processor and a memory encoded with instructions, wherein the instructions when executed on the processor perform the following operations:
    transmitting data frames from a reaction point of a source device;
    receiving, at the reaction point, congestion notification messages corresponding to the transmitted data frames, each congestion notification message including congestion feedback data regarding a particular network switching device and an identifier of the particular network switching device; and
    modifying a congestion profile for the particular network switching device by:
        correlating the identifier of the particular network switching device to a profile entry in a congestion point data sub-table,
        updating the profile entry with the congestion feedback data and a timestamp in response to a determination that the profile entry in the congestion point data sub-table exists, and
        creating a new profile entry in the congestion point data sub-table, the new profile entry including the congestion feedback data and a timestamp, in response to a determination that the profile entry does not already exist in the congestion point data sub-table.

10. The computer system of claim 9, wherein the instructions when executed on the processor perform adjusting a data transmission rate for transmitting data frames based on an analysis of the congestion profile.

11. The computer system of claim 9, wherein the instructions when executed on the processor perform adjusting a data transmission route for transmitting data frames through a network based on an analysis of one or more congestion profiles stored in corresponding congestion point data sub-tables.

12. The computer system of claim 9, wherein the instructions when executed on the processor perform creating a congestion point data table having one or more records therein, each record including a congestion point identifier and a bucket pointer that points to a congestion point data sub-table that is configured to store congestion point data for the device identified by the congestion point identifier.

13. The computer system of claim 12, wherein each congestion point data sub-table comprises one or more profile entries for the device identified by the congestion point identifier, each profile entry including:
    a timestamp indicating when the profile entry was added to the congestion point data sub-table;
    an encapsulated priority value that indicates a data frame's congestion notification priority;
    a quantized feedback value;
    a Qoffset value; and
    a Qdelta value.

14. The computer system of claim 9, wherein the particular network switching device is a network switch with a quantized congestion notification enabled queue.

15. The computer system of claim 9, wherein the identifier is a congestion point identifier having a 64 bit value.

16. The computer system of claim 9, wherein the congestion feedback data includes an encapsulated priority value, a quantized feedback value, a Qoffset value, or a Qdelta value.

17. A computer implemented method for generating congestion profiles for network source devices that are configured to transmit data to a destination device, comprising:
    receiving, at a congestion point, data frames from a reaction point of a source device, wherein the data frames contain congestion feedback data regarding the source device and an identifier of the source device; and
    modifying a congestion profile for the source device by:

correlating the identifier of the source device to a profile entry in a congestion point data sub-table, updating the profile entry with the congestion feedback data and a timestamp in response to a determination that the profile entry in the congestion point data sub-table exists, and creating a new profile entry in the congestion point data sub-table, the new profile entry including the congestion feedback data and a timestamp, in response to a determination that the profile entry does not already exist in the congestion point data sub-table.

18. The method of claim 17, further comprising adjusting congestion point resources based on an analysis of one or more congestion profiles stored in corresponding congestion point data sub-tables.

19. The method of claim 17, wherein the reaction point operates within data link layer (layer 2) of Open Systems Interconnection (OSI) model.

20. The method of claim 17, wherein the source device is a network server.

21. The method of claim 17, wherein the source device is a network switch with a quantized congestion notification enabled queue.

22. The method of claim 17, wherein the identifier is a reaction point identifier having a 16 bit value.

23. A network switching device including a processor and a memory encoded with instructions, wherein the instructions when executed on the processor perform the following operations:

receiving, at a congestion point, data frames from a reaction point of a source device, wherein the data frames contain congestion feedback data regarding the source device and an identifier of the source device; and modifying a congestion profile for the source device by:

correlating the identifier of the source device to a profile entry in a congestion point data sub-table, updating the profile entry with the congestion feedback data and a timestamp in response to a determination that the profile entry in the congestion point data sub-table exists, and creatin a new profile entry in the congestion point data sub-table, the new profile entry including the congestion feedback data and a timestamp, in response to a determination that the profile entry does not already exist in the congestion point data sub-table.

24. The network switching device of claim 23, further comprising adjusting congestion point resources based on an analysis of one or more congestion profiles stored in corresponding congestion point data sub-tables.

25. The network switching device of claim 23, wherein the reaction point operates within data link layer (layer 2) of Open Systems Interconnection (OSI) model.

26. The network switching device of claim 23, wherein the source device is a network server.

27. The network switching device of claim 23, wherein the source device is a network switch with a quantized congestion notification enabled queue.

28. The network switching device of claim 23, wherein the identifier is a reaction point identifier having a 16 bit value.

* * * * *